Patented May 9, 1944

2,348,619

UNITED STATES PATENT OFFICE 2,348,619

WOOD FILLER

Henry Green, New York, N. Y., and Ernest F. Fullam, Princeton, N. J., assignors to Interchemical Corporation, New York, N. Y., a corporation of Ohio No Drawing. Application March 11, 1942, Serial No. 434,264

6 Claims. (Cl. 106—228)

This invention relates to wood fillers, and is directed particularly to a solution of the problem of "graying" of such fillers. In the finishing of open-pored woods such as walnut and mahogany, it is necessary, in order to get a smooth finish, to fill the pores of the wood before the finishing coats are applied. This is customarily done after the staining operation, although it may be done as the first operation. The compositions used generally consist of dispersions of cheap white inert filling pigments, plus the necessary coloring pigments, in a minimum of non-volatile vehicle, reduced to very thin consistency for application with solvents such as petroleum distillates. The thinned filler is brushed on over the entire surface in excess, allowed to become partially set, and is then wiped across the grain into the pores and off the surface of the wood with a cloth, preferably burlap. Because of the peculiar method of application, the inert pigment which actually does the filling of the pores should have some "bite"—i. e., it should be of such characteristics that it will resist removal from the pores, once it gets in. For that reason, fillers containing rather coarse sharp particles, such as silica, have been used conventionally.

A principal problem encountered in wood fillers is their tendency to "graying." This is the development of a gray color in the pores during or after the finishing operation. Its cause has been unknown, and its occurrence unpredictable. The same batch of filler will work with perfect satisfaction at times, and will gray at other times, depending on working conditions. Certain types of formulations minimize graying without preventing it. We have discovered what occurs when a wood filler "grays," and have invented a new type of wood filler in which graying cannot occur.

Our investigation of wood filler graying has proven that when a filler grays, there is a substantial separation of the pigment particles from the inert filler, leaving the gray inert particles visible to the eye. We believe that the separation occurs mechanically, and is caused by movement of the pigment away from the inert with the fluid streams set up by the drawing of the vehicle into the pores of the wood by capillary action, or by the evaporation of solvent, which causes an upward movement. When the pigment moves to the bottom or sides, it is hidden by the inert; when it moves to the top, it may be wiped off the surface. This separation, we believe, occurs in all fillers; however, its occurrence apparently is slow enough under ordinary conditions so that separation of an order sufficient to cause graying does not normally occur. We believe the unpredictable failures of fillers to be due to causes which encourage stratification—e. g., temperature, capillary action, and other conditions of the wood, etc.

Our wood fillers which overcome this graying problem are those in which the size of the pigment particles and the inert particles bear such a relationship to each other that the pigment particles are larger than the spaces existing between the inert particles, so that they are prevented from moving because they have no path through which to travel. Preferably, they are of the same order of magnitude as the inert particles.

The typical inerts used will vary in particle size from sub-microscopic (below 0.1 micron by white light microscopy) to about 40 microns, with an average size of about 1 to 2 microns; the pigments used vary in average size from about 0.2 to 0.5 micron. Obviously, fillers made from such combinations will gray if given the proper conditions. Our invention contemplates changing this conventional relationship in one of several manners.

We may start with a typical filler having a conventional coarse inert. Thus—

Neutral filler A

Parts by weight

| | |
|---|---:|
| Manganese drier (40.0% manganese resinate, 5.0% oleic acid, 27.5% high-flash naphtha, 27.5% turpentine) | 3.8 |
| Lead drier (14.4% Pb as lead naphthenate in solvent naphtha) | 3.8 |
| O-amyl phenol | 0.2 |
| Varnolene | 6.9 |
| Alkyd resin (60% linseed oil modified glycerol phthalate) | 17.6 |
| Silica (particle size ranging from 0.5 to 20 microns, with bulk in coarse range) | 51.9 |
| Asbestine (particle size ranging from 0.2 to 40 microns, with the bulk in the coarse range) | 15.8 |

This neutral filler is ordinarily mixed with a pigment ground in linseed oil, to get the proper color. When ordinary burnt umber ground in oil is mixed in, in which the umber particles have been ground to very small size, a conventional filler is obtained, which grays in an unpredictable fashion.

This filler may be converted into a non-graying filler simply by the use of dry pigment of the proper size, such as dry ground burnt umber, mixed into a varnish without further grinding. Material retained on an 80-mesh screen is so coarse that it will not go into the pores of most woods, but all material which passes 80-mesh (including the 80 to 100 fraction, the 100 to 200 fraction, the 200 to 325 fraction, and the minus 325 fraction) gives satisfactory fillers. Where the umber is ground in oil, however, to a smooth paste, graying again occurs.

This method of retarding graying has certain marked disadvantages. The full color value of the pigment is not obtained, and since most colors require a mixture of pigments, many of which cannot be had except in very small particle size, the method is restricted to a very few colors.

A far better method is to replace the conventional inert with a fine inert, in the small particle size range of about 0.5 micron average, or lower. We have used Multifex (a very fine magnesium carbonate), Silene (a hydrated calcium silicate), Micatone (a very fine micaceous inert), and fine magnesium oxides and carbonates. Santocell (an alumina aerogel) can also be used, but because of its high bulk, filling can be obtained with a much smaller weight of inert. All of these inerts are of much smaller particle size than the silica and asbestene heretofore used; the interstices between the particles are thus small enough to catch the pigment and prevent motion with the vehicle liquid.

Flocculation of the pigment on to the inert is still another method; this in effect produces a flocculate in which pigment and inert form part of the same particle. Because flocculation is difficult to control, and requires different methods for different pigments which may be wanted for simultaneous use to produce a desired color, we prefer not to use this method.

A fourth method comprises dyeing of the inert. This can be done by the use of various water- or alcohol-soluble dyes such as are used for staining wood. Thus, we prepared an alcoholic solution of Calcozine Brown RX, conc. and immersed various inerts (Multifex, Santocell, magnesium carbonate, calcium silicate) in the solution, allowing the filler to adsorb the dye. Phosphine R extra concentrated was similarly deposited, from alcoholic solution, on the above materials and on talc, rotten stone, kaolin, etc. The dyed inerts could then be used to prepare non-graying fillers.

Obviously, the typical filler described above can be replaced by other oil, oleoresinous and resinous wood fillers, and the particular vehicles, pigments and inerts are only shown by way of examples.

We claim:

1. A non-graying wood filler composition comprising a vehicle of the group consisting of fatty oil, oleoresinous and resinous varnishes, having distributed therethrough discrete particles of a finely divided inert white filling agent, and particles of a finely divided coloring agent insoluble in the vehicle, the filler being characterized by the fact that all of the discrete particles distributed through the filler are of the same order of average particle size.

2. A non-graying wood filler composition comprising a vehicle of the group consisting of fatty oil, oleoresinous and resinous varnishes, having distributed therethrough discrete particles of a finely divided inert white filling agent, and discrete particles of a finely divided coloring agent insoluble in the vehicle, the filler being characterized by the fact that all of the discrete particles distributed through the filler are of the same order of average particle size, and below about 0.5 micron.

3. A non-graying wood filler composition comprising a vehicle of the group consisting of fatty oil, oleoresinous and resinous varnishes, having distributed therethrough discrete particles of a finely divided inert white filling agent, and particles of a finely divided coloring agent insoluble in the vehicle, the filler being characterized by the fact that all of the discrete particles distributed through the filler are of the same order of average particle size, and by the further fact that the particles of finely divided coloring agent are adherent to the discrete particles of filling agent.

4. A non-graying wood filler composition comprising a vehicle of the group consisting of fatty oil, oleoresinous and resinous varnishes, having distributed therethrough discrete particles of a finely divided inert white filling agent, and particles of a finely divided coloring agent insoluble in the vehicle, the filler being characterized by the fact that all of the discrete particles distributed through the filler are of the same order of average particle size, and by the further fact that the particles of finely divided coloring agent are adsorbed on the discrete particles of filling agent as a dye therefor.

5. A non-graying wood filler composition comprising a vehicle of the group consisting of fatty oil, oleoresinous and resinous varnishes, having distributed therethrough discrete particles of a finely divided inert white filling agent, and particles of a finely divided coloring agent insoluble in the vehicle, the filler being characterized by the fact that all of the discrete particles distributed through the filler are of the same order of average particle size, and by the further fact that the particles of finely divided coloring agent are of a fine pigment flocculated onto the discrete particles of filling agent.

6. A non-graying wood filler composition comprising a vehicle of the group consisting of fatty oil, oleoresinous and resinous varnishes, having distributed therethrough discrete particles of a finely divided inert white filling agent, and discrete particles of a finely divided coloring agent insoluble in the vehicle, the filler being characterized by the fact that the particles of filling agent and the particles of the coloring agent are of the same order of average particle size.

HENRY GREEN.
ERNEST F. FULLAM.